(12) United States Patent
Hsu

(10) Patent No.: US 7,758,217 B2
(45) Date of Patent: Jul. 20, 2010

(54) LAMP SUPPORT STRUCTURE

(75) Inventor: Jia-Lang Hsu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 278 days.

(21) Appl. No.: 12/025,111

(22) Filed: Feb. 4, 2008

(65) Prior Publication Data

US 2008/0310174 A1 Dec. 18, 2008

(30) Foreign Application Priority Data

Jun. 15, 2007 (TW) ................ 96121741 A

(51) Int. Cl.
*F21V 21/088* (2006.01)
(52) U.S. Cl. ............... 362/396; 362/97.2; 362/217.16; 362/217.17; 362/225; 362/634; 248/74.2; 248/541
(58) Field of Classification Search ............ 362/97.2, 362/217.08, 217.09, 217.16, 217.17, 225, 362/396, 634; 248/74.2, 541
See application file for complete search history.

(56) References Cited

U.S. PATENT DOCUMENTS 3,154,281 A * 10/1964 Frank .................. 248/201
7,434,958 B2 * 10/2008 Yang et al. .............. 362/225
2005/0207149 A1 * 9/2005 Ono et al. ............... 362/216
2007/0081322 A1 * 4/2007 Choi et al. ............... 362/97

FOREIGN PATENT DOCUMENTS

JP 2000-11736 1/2000

OTHER PUBLICATIONS

English language translation of abstract of JP 2000-11736.

* cited by examiner

*Primary Examiner*—Stephen F Husar
*Assistant Examiner*—James W Cranson
(74) *Attorney, Agent, or Firm*—Thomas, Kayden, Horstemeyer & Risley

(57) ABSTRACT

A lamp support structure is disclosed using in a backlight module. The lamp support structure comprises a base, extending downwards, and two arms. Each arm comprises an inner curved edge and an opposite outer curved edge, both extending upwards from the base to define a receiving space. Moreover, each arm comprises a top end to define an opening such that a lamp can fit into the receiving space through the opening. The lateral dimension of the opening is smaller than that of the lamp. Each arm comprises a first section, including an upper portion and a lower portion, wherein the lower portion extends upwards from the base and the lateral cross-section dimension of the first section tapers from the base toward the upper portion.

14 Claims, 6 Drawing Sheets

LAMP SUPPORT STRUCTURE

This application claims priority to Taiwan Patent Application No. 096121741 filed on Jun. 15, 2007; the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a clamp. Specifically, the invention relates to a lamp support structure in a backlight module.

2. Descriptions of the Related Art

With the recent and rapid development of the flat panel display, the size thereof has been increasingly enlarged. The lamp in the backlight module has to be enlarged in length accordingly to provide adequate luminance for the enlarged direct backlight module for use in a liquid crystal display (LCD). However, an overlong lamp in a large-sized backlight module is subject to fracture during the shock or vibration test. To overcome such a problem, as shown in FIG. 1, several lamp supports are added to the middle section of each lamp in the conventional backlight module in an attempt to support the overlong lamp and avoid unexpected fractures. A variety of designs are available for the lamp supports at present, one of which is depicted in FIG. 2. Unfortunately, these lamp supports fail to provide adequate clamping force in practical use, which tends to not support the lamps well and the lamps probably will escape out of such lamp supports, leading to damage to the lamps and thereby, degrading the luminance provided by the light source.

In view of this, some solutions in the prior art increase the clamping force of the lamp supports by enlarging the size thereof. However, this entails an accordingly increased pushing force to assemble the lamp onto the lamp supports, which may add complexity to such an assembly process. Accordingly, to accommodate for the increasingly large lamp in diameter and length in the backlight module, it is desirable to provide a new lamp support design that may supply an adequate clamping force but require a decreased pushing force when assembling the lamp onto the lamp support.

SUMMARY OF THE INVENTION

One objective of this invention is to provide a lamp support structure using in a large-sized backlight module that supplies an adequate clamping force but decreases the pushing force when assembling a lamp onto the lamp support.

To this end, a lamp support structure is provided in this invention, which comprises a base extending downwards and two arms. Each of the arms includes an inner arc edge and an opposite outer arc edge, both extending upwards from the base to define a receiving space. Moreover, each of the arms comprises a top end to define an opening such that a lamp is adapted to fit into the receiving space through the opening. The lateral size of the opening is smaller than that of the lamp. Each of the arms comprises a first section including an upper portion and a lower portion, wherein the lower portion extends upwards from the base and the cross-sectional dimension of the first section tapers from the base through the lower portion towards the upper portion.

Also to this end, the lamp support structure in the another embodiment of this invention is provided, which comprises a base and two vertical arms. Each of the vertical arms extends upwards from the base to define a receiving space. Each of the vertical arms further comprises a protrusion at the top end of the vertical arms defines an opening, such that a lamp is adapted to fit into the receiving space through the opening. In addition, the lateral dimension of the opening is less than that of the lamp. Each of the vertical arms also has a first section with an upper portion and a lower portion, and the first section has a cross section tapering from the base through the lower portion towards the upper portion.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
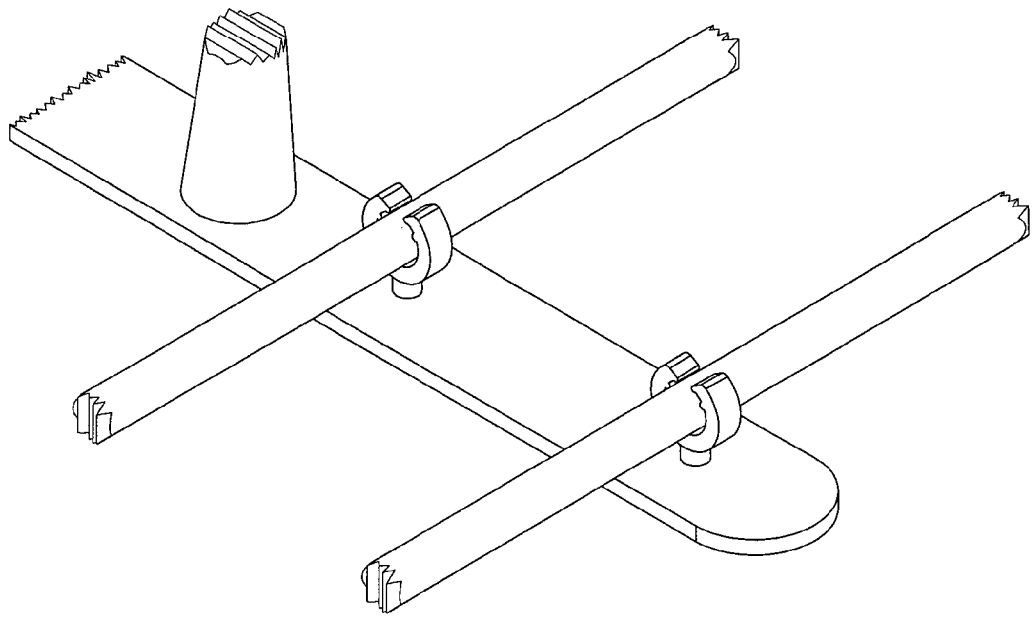
FIG. 1 schematically illustrates a lamp support disposed in the backlight module of the prior art.
Figure 2:
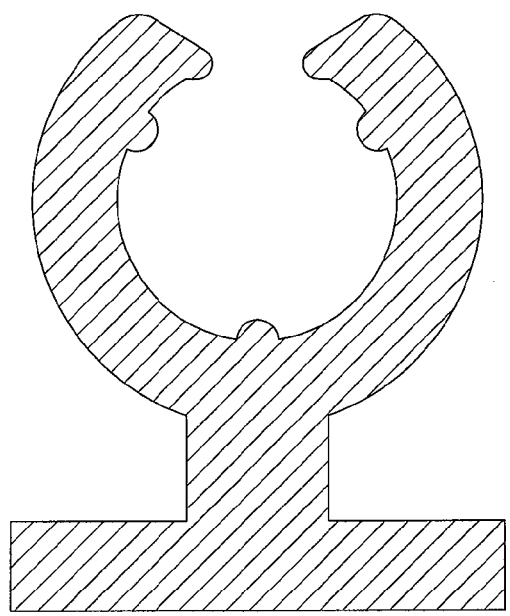
FIG. 2 schematically illustrates the lamp support of the prior art.
Figure 3:
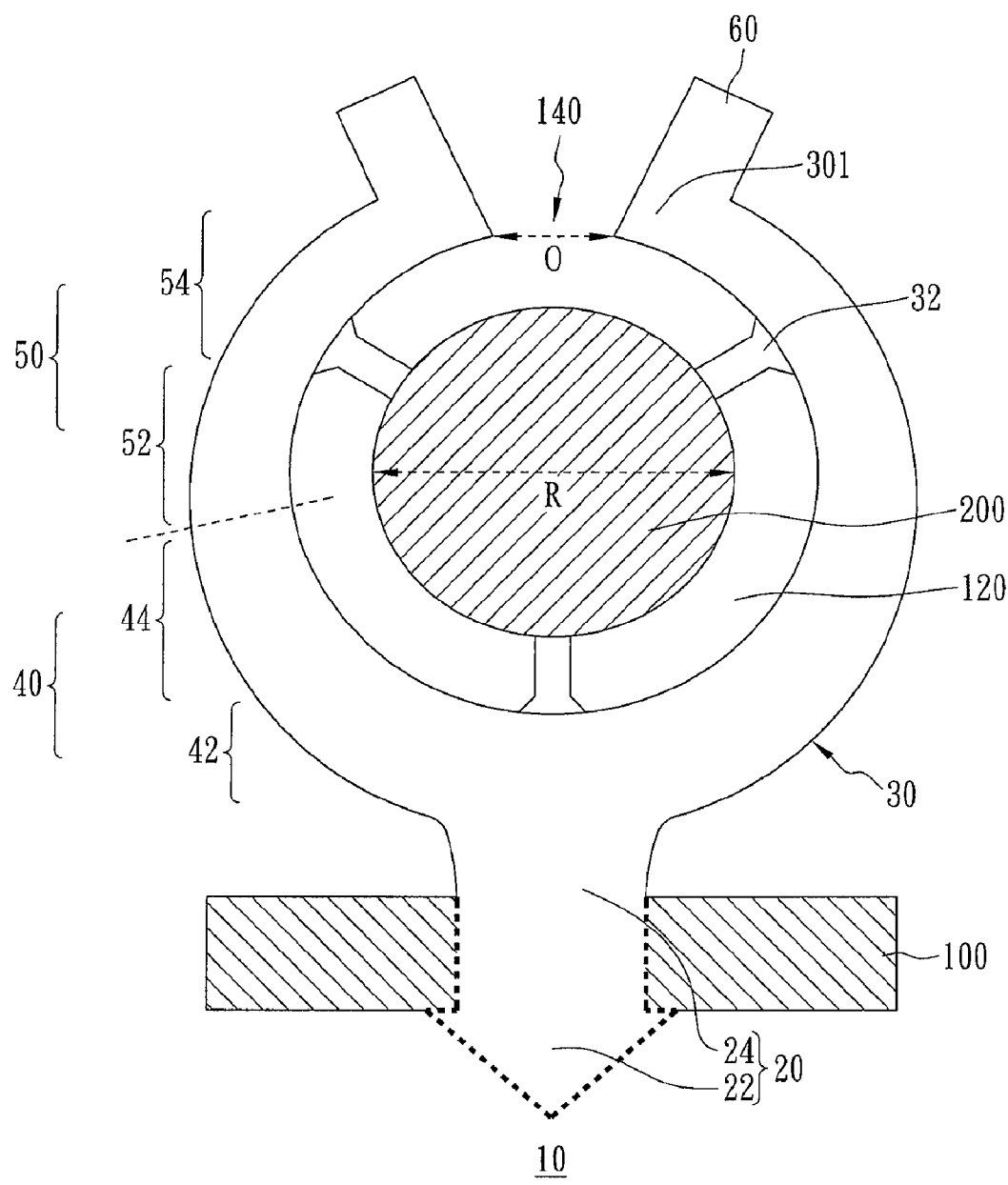
FIG. 3 schematically illustrates a cross section of a lamp support structure adapted to support a backlight module lamp in accordance with an embodiment of this invention.

As shown in FIG. 3, a schematic cross-sectional view of a lamp support structure for supporting a lamp in a backlight module is depicted in accordance with an embodiment of this invention. The lamp support structure 10 of this invention primarily comprises a base 20 and two arms 30, and may be integrally formed from a non-metal material, for example, a plastic material, to avoid uneven temperature distribution. The base 20 comprises a hold-down 22 extending downwards and a base body 24. The hold-down 22 is adapted to engage in the back bezel 100 of the backlight module (not shown), so that the lamp support structure 10 is firmly fixed in the back bezel 100. Once held on the back bezel 100, all the primary portions of the lamp support structure 10, except for the hold-down 22, including the base body 24 and both arms 30, are disposed above the back bezel 100 to provide a firm clamp on the lamp 200 of the backlight module.

Secondly, both arms 30 of the lamp support structure 10 of this invention are a cantilever beams positioned roughly in a semi-circle, and extend from the base body 24 upwards to above the back bezel 100, to define the receiving space 120 for the lamp 200. Each arm 30 has a top end 301 at the end opposite to the base body 24, an inner curved edge and an opposite outer curved edge. The two top ends of both arms 30 cooperate together to define an opening 140 so that the lamp 200 is adapted to be received or fit into the receiving space 120 through the opening 140. It should be noted that the opening 140 has a minimum lateral dimension O less than the lateral dimension R of the lamp 200 (i.e., the lamp diameter), so that the lamp can be firmly fixed in the receiving space 120 by the lamp support structure 10.

According to this embodiment of the invention, each of the arms 30 of the lamp support structure 10 further comprises at least one protrusion 32, which extends radially inwards from the inner curved edge to clamp the lamp 200 in the receiving space 120.

The lamp support structure 10 of this invention is characterized by the strengthened arms 30 providing a large clamping force and a relatively even stress distribution. Specifically, in the embodiment of this invention, each arm 30 has a first section 40 and a second section 50, in which the first section 40 further has a lower portion 42 and upper portion 44, as shown by the dashed line in FIG. 3. The lower portion 42 extends upwards from the base body 24, and the upper portion 44 in turn adjoins the lower portion 42. The lamp support structure 10 of this invention is characterized by the first section 40 of each arm 30 having a gradually changing cross section. In more detail, the first section 40 of each arm 30 has a cross section tapering from the lower portion towards the upper portion 44.

On the other hand, the second section 50 of the lamp support structure 10 of this invention also comprises a lower portion 52 and an upper portion 54, further extends upwards from the upper portion 44 of the first section 40. In more detail, the lower portion 52 of the second section 50 adjoins the upper portion 44 of the first section 40, while the upper portion of the second section 50 adjoins the top end 301 of the lamp support structure 10.

In this embodiment, in contrast with the first section 40, the second section 50 of each arm 30 has a uniform cross section. However, to achieve a large clamping force and an even distribution of force in the lamp support structure 10 disclosed in this invention, the first section 40 with the tapering cross section must have a length no less than one third the total length of each of the arms 30, thereby to obtain an even stress distribution and provide a better resiliency of the arms. In other words, the higher the percentage of the first section 40 existed in the total arm length, the better the stress distribution evenness and the resiliency. The variation of the first section will now be described in detail hereinafter.

After a theoretical analysis on the construction and mechanics of the materials in combination with an actual test result, the cross sectional variation of the first section 40 must comply with the cross section formula described below to achieve the above-mentioned objective of this invention. The cross section in this invention may be in a rectangular form, a circular form or any desired forms, while the cross section formula described in this invention is adapted to any cross-sectional form.

Figure 4:
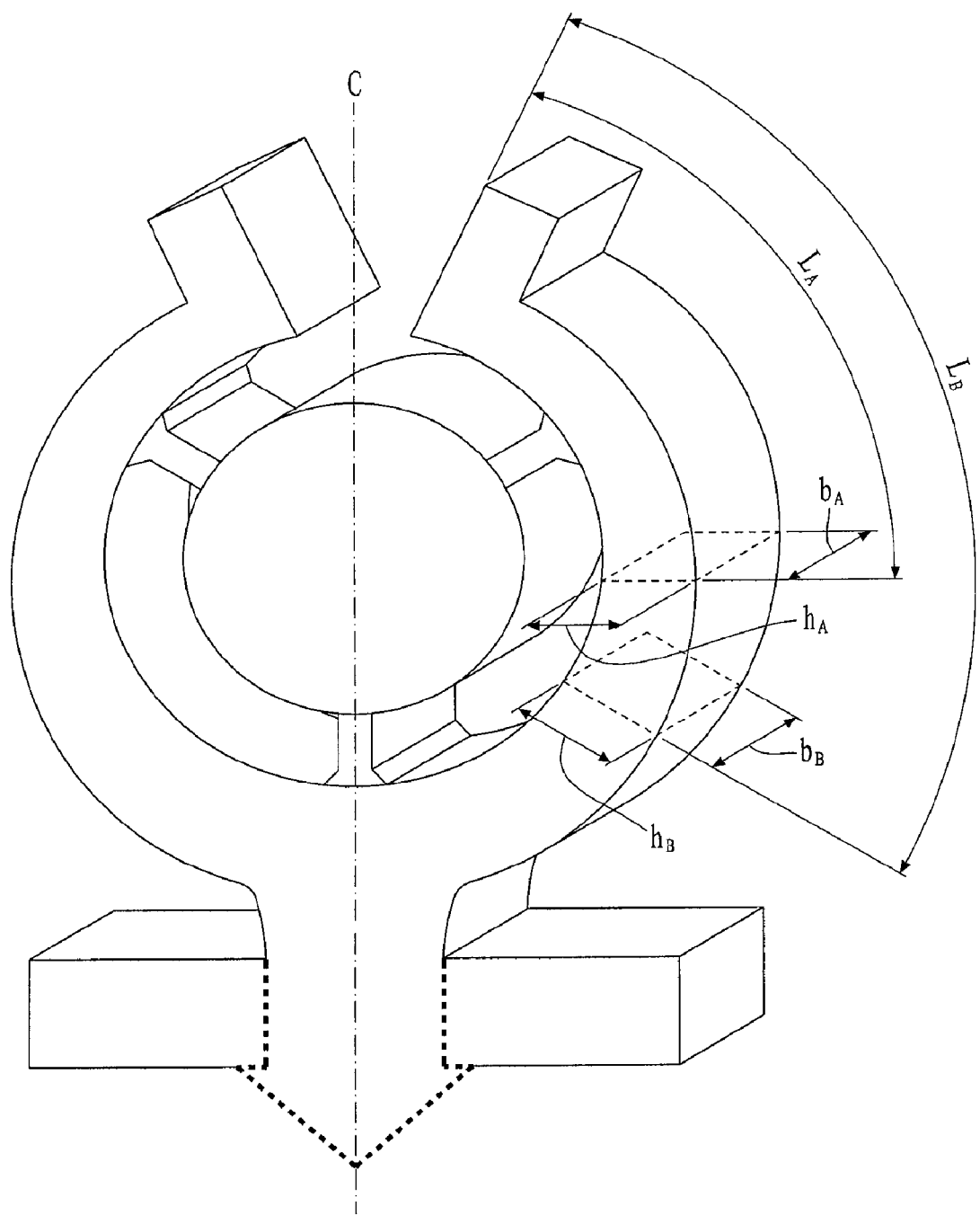
FIG. 4 schematically illustrates a cross section of a lamp support structure in accordance with an embodiment of this invention.

The first section 40 with a rectangular cross section is hereby taken as an example. As shown in FIG. 4, any one of the cross sections of the first section 40 is defined to lie in a plane normal to the vertical axis (c) of the lamp, and has a thickness (b) and a width (h). The thickness (b) is the maximum distance between the front edge and rear edge of the rectangular cross section, while the width (h) is the maximum distance from the inner curved edge to the outer curved edge thereof. In this embodiment, any two of the cross sections of the first section 40 (with the representative cross sections A and B as examples) have relationships represented by the following formulas (1) and (2):

$$1 < \frac{h_B}{h_A} < \sqrt{\left(1 + 3\frac{L_B - L_A}{L_A}\right)} \quad (1)$$

The term $h_A$ refers to the width of the cross section A, the term $h_B$ refers to the width of the cross section B, the term $L_A$ refers to the length from the cross section A to the top end of the lamp support structure, and the term $L_B$ refers to length from the cross section B to the top end of the lamp support structure.

$$1 < \frac{b_B}{b_A} < 1 + 3\frac{L_B - L_A}{L_A} \quad (2)$$

The term $b_A$ refers to the thickness of the cross section A, the term $b_B$ refers to the thickness of the cross section B, and other symbols are just the same as defined in formula (1).

As described above, this invention adjusts the variation percentage of cross-sections appropriately in response to the different arm cross sections in the lamp support structure 10, to achieve an even stress distribution in each arm and increase the elastic strength of the arms. For example, in formula (1), when the thickness ratio of the two cross sections substantially approaches $\sqrt{(1+3(L_B-L_A)/L_A)}$, the lower portion of the arm will become excessively large, which makes it difficult to flex and causes an excessive overall rigidity. This would result in an excessive contact pressure between the lamp and the lamp supports, leading to unexpected damage to the materials and consequent excessive plastic deformation of the second section. Moreover, it should be emphasized that the first section is adapted to have a length no less than one third of the total arm length, or else the plastic deformation would still be concentrated in the lower portion.

Figure 5A:
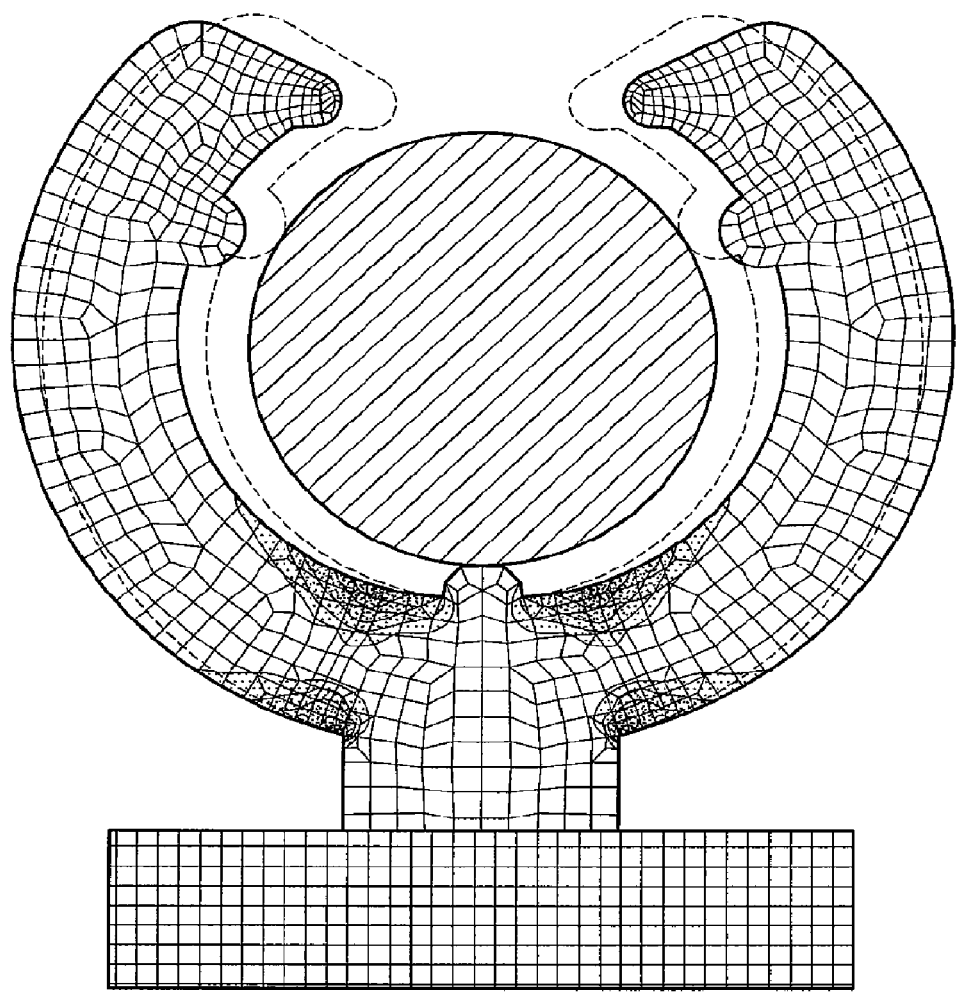
FIG. 5A schematically illustrates a computer simulation on the stress distribution of a prior art lamp support structure.
Figure 5B:
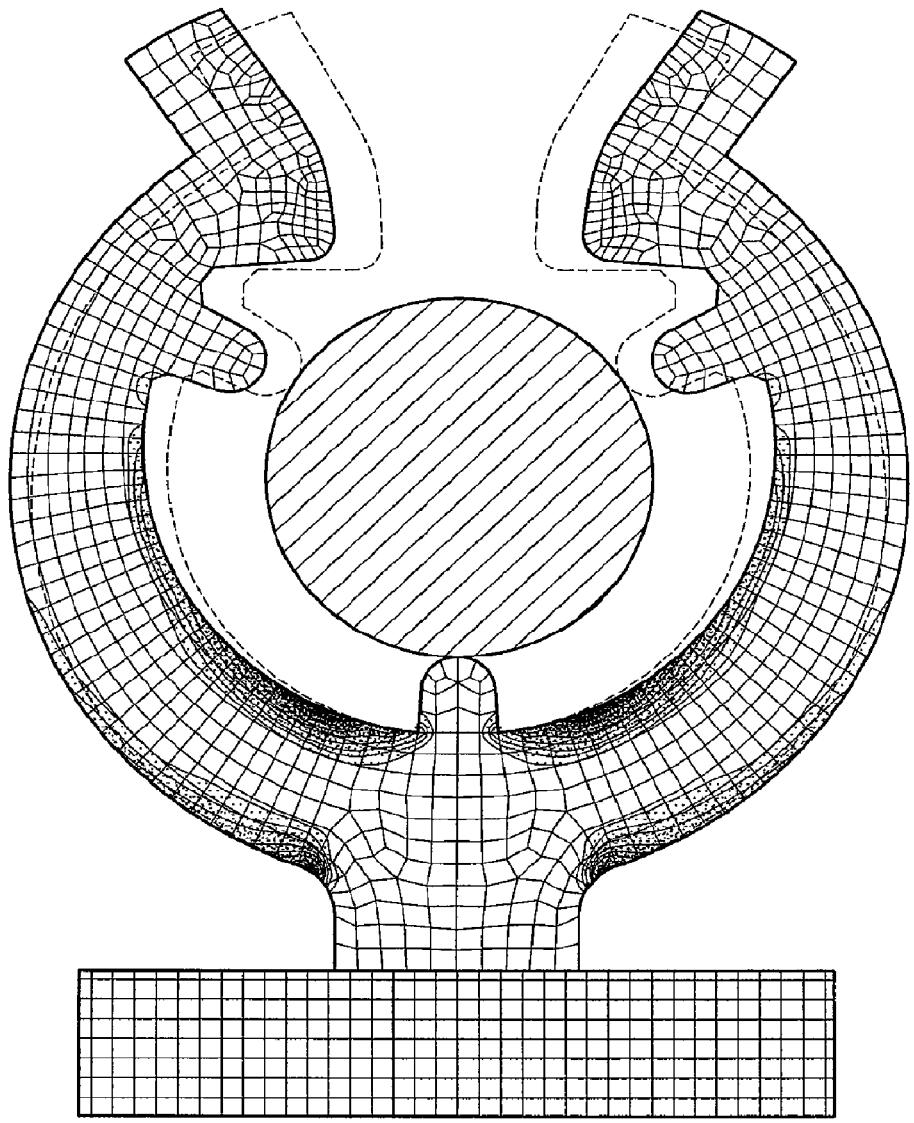
FIG. 5B schematically illustrates a computer simulation on the stress distribution of a lamp support structure in accordance with an embodiment of this invention.

FIGS. 5A and 5B illustrate schematic views of computer simulation results in accordance with the prior art and the embodiment of this invention are depicted respectively, illustrating the stress distribution in the prior art structure and the inventive structure given the same lamp diameter.

FIG. 5A is a schematic view of a computer simulation result on the stress distribution in a conventional lamp support structure with a uniform cross section. As clearly shown in FIG. 5A, the strain arising from the stress is mostly concentrated in the lower portion of the lamp support. Therefore, when the opening of the conventional lamp support structure is forced to open by a lamp, the strain will be concentrated in the lower portion of the lamp support, leading to an excessive plastic strain therein. This may degrade the rigidity of the support structure significantly, resulting in an insufficient clamping force.

By contrast, as shown in FIG. 5B, the stress obtained in this invention is more uniformly distributed in other portions of the arms. Therefore, the lamp support structure 10 disclosed in this invention may more flexibly withstand the strain occurred during lamp assembly, thus preventing permanent deformation due to excessively concentrated stress.

Additionally, to effectively mitigate the resistance encountered during lamp assembly, each arm 30 of this invention further comprises two guiding portions 60 (referring to FIG. 3), which extend upwards from the top ends 301 of the arms respectively to form a funnel-like feature to guide the lamp 200 into the receiving space 120 smoothly through the opening 140. The design of the guiding portions 60 may effectively mitigate the resistance encountered when assembling the lamp into the backlight module. Consequently, in conjunction with the cross section variation of arms described above, this invention may provide a lamp support structure featuring little assembly resistance, a relatively even stress distribution and a relatively large clamping force.

For example, as demonstrated by the results of an actual test, a pushing resistance of 10.5 N was experienced when pushing a lamp into the lamp support structure of the prior art. The removal force (i.e., a reaction force against the clamping force of the lamp support structure) necessary to pull out the lamp from this lamp support structure was 7.2 N. By contrast, the pushing resistance and the removal force for a lamp support structure of this invention were 7.7 N and 8.4 N respectively. It can be clearly seen from such a comparison that a lesser pushing resistance is experienced when engaging the lamp into the lamp support structure of this invention. However, once the lamp is assembled into the support structure, the lamp support structure of this invention will deliver an increased clamping force. That is, a greater clamping force is applied on the lamp, thus, holding the lamp in place. The problem for the lamp being come off the support as suffered in the prior art will be solved.

Figure 6:
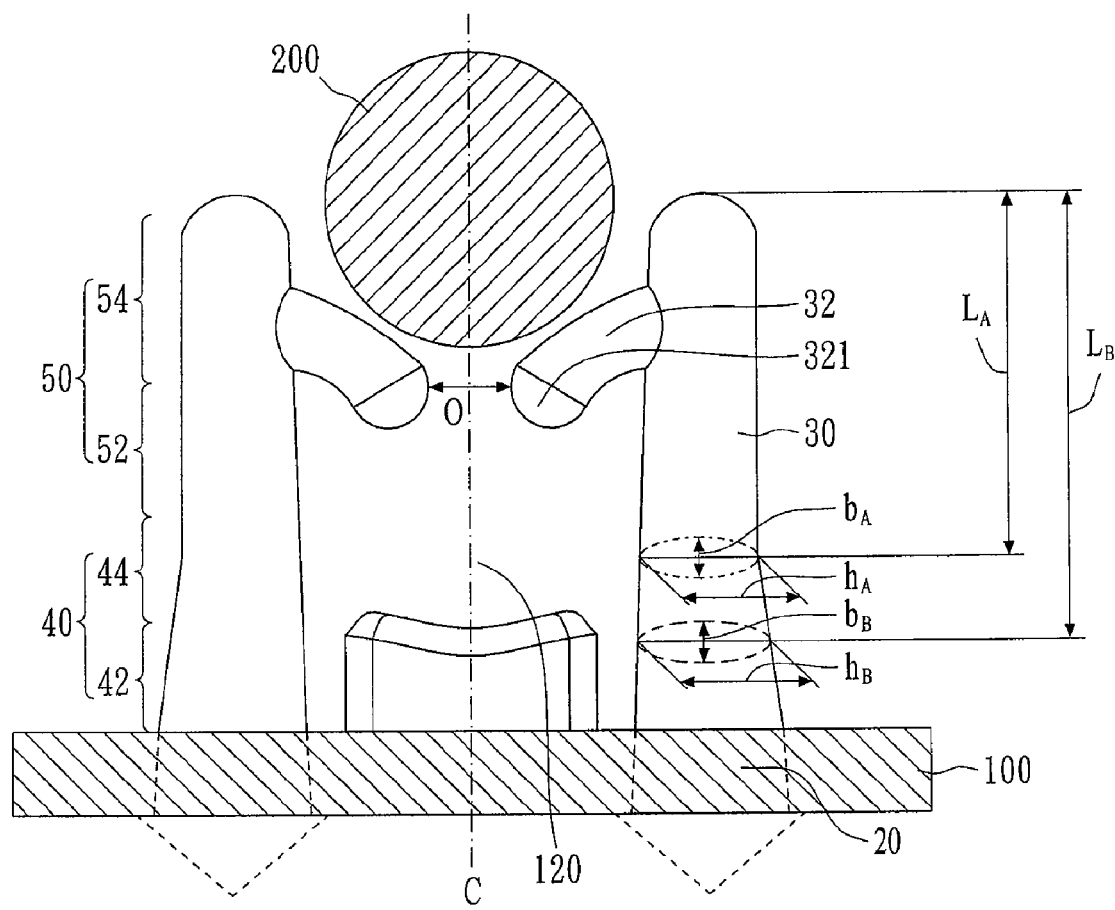
FIG. 6 schematically illustrates a cross section of a lamp support structure in accordance with another embodiment of this invention.

It should be noted that the lamp support structure disclosed above is only intended to be an example, and those skilled in the art may apply the disclosure of this invention to different support structure profiles depending on the actual requirements. For example, in reference to FIG. 6, another implementation aspect of the lamp support structure of this invention is depicted therein. The lamp support structure comprises two upright arms 30, both comprising a base 20 and extending upwards from the base 20 respectively to define the receiving space 120 for receiving the lamp 200. Each of the arms 30 further comprises a protrusion 32. The top ends 321 of the two protrusions 32 define an opening O therebetween so that a lamp can fit in the receiving space through the opening and hold therein. Additionally, the protrusions 32 in this embodiment also serve the same guiding functions as the guiding portions 60 of the previous embodiment so that the lamp 200 is guided into the receiving space 120 through the opening 140. Each of the upright arms 30 has generally the same features as those described above, i.e., each of the upright arms 30 has a first section 40 including an upper portion 44 and a lower portion 42. The cross section of the first section 40 tapers from the base towards the upper portion to provide an even stress distribution and a better clamping force. In this embodiment, each of the upright arms 30 also has a second section 50, which extends upwards from the upper portion 44 of the first section 40 and also comprises a lower portion 52 and an upper portion 54. In more detail, the lower portion 52 of the second section 50 adjoins the upper portion 44 of the first section 40. The second section 50 has the same features as those of the previous embodiment and also has a uniform cross section.

In the following descriptions, the first section 40 with a rectangular cross section is used as an example. In reference to FIG. 6, any one of the cross sections of the first section 40 is defined to lie in a plane normal to the vertical axis (c) of the lamp, and has a thickness (b) and a width (h). The thickness (b) is the maximum distance between the front edge and the rear edge of the rectangular cross section, while the width (h) is the maximum distance from the inner edge to the outer edge thereof. In this embodiment, any two of the cross sections of the first section 40 (with the representative cross sections A and B as examples) have relationships represented by the following formulas (1) and (2):

$$1 < \frac{h_B}{h_A} < \sqrt{\left(1 + 3\frac{L_B - L_A}{L_A}\right)} \quad (1)$$

The term $h_A$ refers to the width of the cross section A, the term $h_B$ refers to the width of the cross section B, the term $L_A$ refers to the length from the cross section A to the top end of the lamp support structure, and the term $L_B$ refers to the length from the cross section B to the top end of the lamp support structure.

$$1 < \frac{b_B}{b_A} < 1 + 3\frac{L_B - L_A}{L_A} \quad (2)$$

The term $b_A$ refers to the thickness of the cross section A, the term $b_B$ refers to the thickness of the cross section B, and the other symbols are just the same as defined in formula (1).

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lamp support structure in a backlight module, comprising:
   a base; and
   two arms, each of the arms extending upward from the base to define a receiving space and comprising:
   a top end, defining an opening such that a lamp is adapted to be received in the receiving space through the opening, the opening has a lateral dimension less than that of the lamp;
   a first section, including an upper portion and a lower portion, wherein the lower portion extends upward from the base and the first section has a cross section tapering from the base toward the upper portion; and
   two guiding portions, extending upward from the top ends of the arms respectively, to facilitate the lamp being assembled through the opening.

2. The lamp support structure of claim 1, wherein each of the arms further comprises a second section, extending upward from the upper portion of the first section to the top end.

3. The lamp support structure of claim 2, wherein the second section of each of the arms includes uniform cross-sections.

4. The lamp support structure of claim 1, wherein each of the arms includes an inner curved edge and an opposite outer curved edge.

5. The lamp support structure of claim 4, wherein any one of the cross sections of the arms is defined to lie in a plane normal to a vertical axis of the lamp, and includes a width (h) which is a maximum distance from an inner curved edge to an outer curved edge thereon, and wherein any two of the cross sections of each of the arms has following relationship:

$$1 < \frac{h_B}{h_A} < \sqrt{\left(1 + 3\frac{L_B - L_A}{L_A}\right)}$$

Wherein,
$h_A$ is a width of a cross section A,
$h_B$ is a width of a cross section B,
$L_A$ is a length from the cross section A to the top end, and
$L_B$ is a length from the cross section B to the top end.

6. The lamp support structure of claim 4, wherein anyone of the cross sections of the arms is defined to lie in a plane normal to a vertical axis of the lamp, and includes a thickness (b) which is a maximum length between a front edge and a rear edge thereon, and wherein any two of the cross sections of each of the arms has following relationship:

$$1 < \frac{b_B}{b_A} < 1 + 3\frac{L_B - L_A}{L_A}$$

Wherein,
$b_A$ is a thickness of a cross section A,
$b_B$ is a thickness of a cross section B,
$L_A$ is a length from the cross section A to the top end, and
$L_B$ is a length from the cross section B to the top end.

7. The lamp support structure of claim 1, wherein the first section of each of the arms has a length not less than one third of a total length of each of the arms.

8. The lamp support structure of claim 1, wherein the base includes a hold-down, which is adapted to engage in a back bezel of the backlight module such that the lamp support structure is firmly fixed in the backlight module.

9. A lamp support structure in a backlight module, comprising:
two vertical arms, each of the vertical arms comprising:
a base, wherein each of the vertical arms extending upward from the base to define a receiving space;
a protrusion, including a top end;
an opening such that a lamp is adapted to be received in the receiving space through the opening; and
a first section, including an upper portion and a lower portion, wherein the first section has a cross section tapering from the base toward the upper portion.

10. The lamp support structure of claim 9, wherein each of the vertical arms further comprises a second section, extending upward from the upper portion of the first section, and the second section includes an upper portion and a lower portion.

11. The lamp support structure of claim 10, wherein the second section of each of the vertical arms includes uniform cross-section.

12. The lamp support structure of claim 9, wherein the first section of each of the vertical arms has a length not less than one third of a total length of each of the vertical arms.

13. The lamp support structure of claim 9, wherein any one of the cross sections of the vertical arms is defined to lie in a plane normal to a vertical axis of the lamp and includes a width (h) which is a maximum distance from an inner edge to an outer edge thereon, and wherein any two of the cross sections of each of the vertical arms has following relationship:

$$1 < \frac{h_B}{h_A} < \sqrt{\left(1 + 3\frac{L_B - L_A}{L_A}\right)}$$

Wherein,
$h_A$ is a width of a cross section A,
$h_B$ is a width of a cross section B,
$L_A$ is a length from the cross section A to the top end, and
$L_B$ is a length from the cross section B to the top end.

14. The lamp support structure of claim 9, wherein any one of the cross sections of the vertical arms is defined to lie in a plane normal to a vertical axis of the lamp, and includes a thickness (b) which is a maximum length between a front edge and a rear edge thereon, and wherein any two of the cross sections of each of the vertical arms has a relationship:

$$1 < \frac{b_B}{b_A} < 1 + 3\frac{L_B - L_A}{L_A}$$

Wherein,
$b_A$ is a thickness of a cross section A,
$b_B$ is a thickness of a cross section B,
$L_A$ is a length from the cross section A to the top end, and
$L_B$ is a length from the cross section B to the top end.

* * * * *